United States Patent [19]

Sullivan

[11] 3,998,300
[45] Dec. 21, 1976

[54] DRUM BRAKE SHOE
[75] Inventor: William M. Sullivan, Dayton, Ohio
[73] Assignee: General Motors Corporation, Detroit, Mich.
[22] Filed: Apr. 14, 1976
[21] Appl. No.: 676,754
[52] U.S. Cl. .......................... 188/250 A; 29/411; 188/234
[51] Int. Cl.² ..................................... F16D 65/08
[58] Field of Search ............ 29/411, 415; 188/234, 188/250 A, 250 B, 250 E, 250 G, 250 R; 192/75

[56] References Cited
UNITED STATES PATENTS 2,040,551  5/1936  Green .............................. 188/234
2,791,300  5/1957  Bonkowski .................... 188/234

Primary Examiner—Duane A. Reger
Attorney, Agent, or Firm—D. D. McGraw

[57] ABSTRACT

A drum brake shoe has a rim providing a lining support plate, the rim edges being formed with projections and recesses on either side of a center section. The width of the rim is substantially constant throughout the majority of its arcuate length. The arrangement permits the stamping of nested rim blanks, each blank extending transversely across a sheet, with approximately 25 percent less material used than would be the case if the rims were made of full constant width to support the entire brake lining. The brake lining is attached to the outer surface of the rim and is directly supported by the rim center section and the projections extending laterally therefrom. The lining is unsupported in the areas where it extends over the recesses. The projections and recesses may be generally rectangular or curvilinear.

3 Claims, 4 Drawing Figures

DRUM BRAKE SHOE

This invention relates to a shoe assembly for drum brakes, and more particularly to one in which the rim uses less material than rims supporting the entire undersurface of the brake lining. This is accomplished by providing rim edge sections shaped with recesses and projections, the lining being attached to the rim and supported only by the center section and the projections. The projections and recesses on one rim edge are complementary to the recesses and projections on the other edge so that the rims can be made in a nested manner. The rims will also have a substantially constant width at any particular point. In one modification of the invention the recesses and projections are generally rectangular, and in another modification they are curvilinear.

IN THE DRAWING

Figure 1:
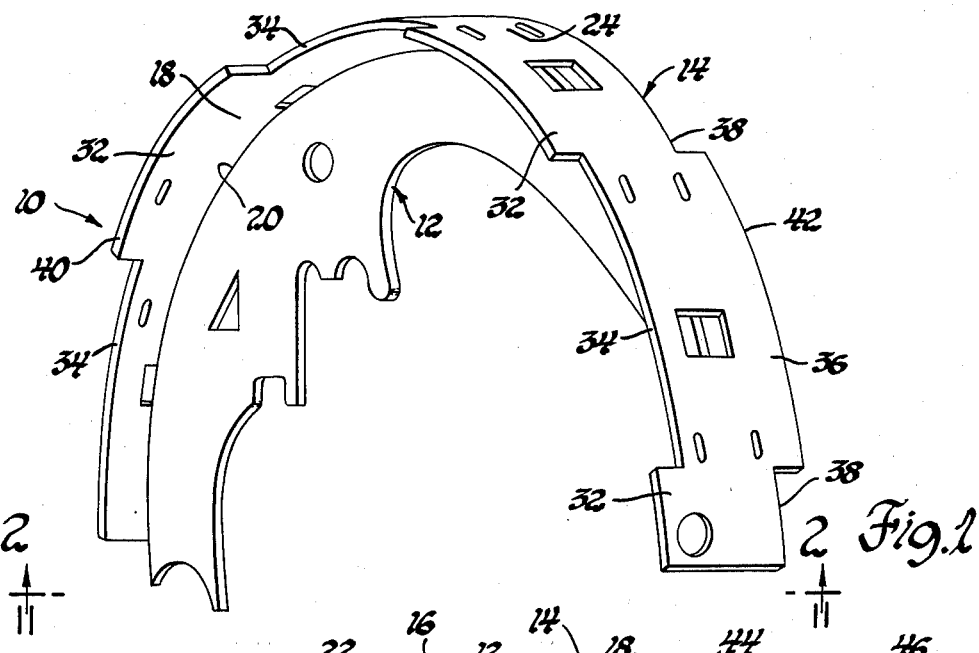
FIG. 1 is a perspective view of a brake shoe assembly embodying the invention, showing the shoe and rim before the brake lining has been attached.

The shoe assembly 10 includes a web 12, a lining support plate or rim 14 and a lining 16 of suitable friction material. The web and rim are usually blanked from sheet metal and secured together with the rim inner surface 18 engaging the arcuate outer edge 20 of the web. The lining 16 is curved so that its inner surface 22 engages the rim outer surface 24, the lining thereby being supported by the rim where surfaces 22 and 24 meet.

Figure 2:
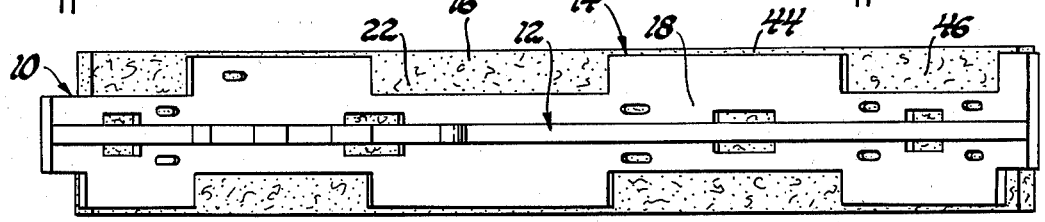
FIG. 2 is a view of the shoe assembly of FIG. 1, taken in the direction of arrows 2—2 of that Figure, and showing the lining installed on the shoe rim.
Figure 3:
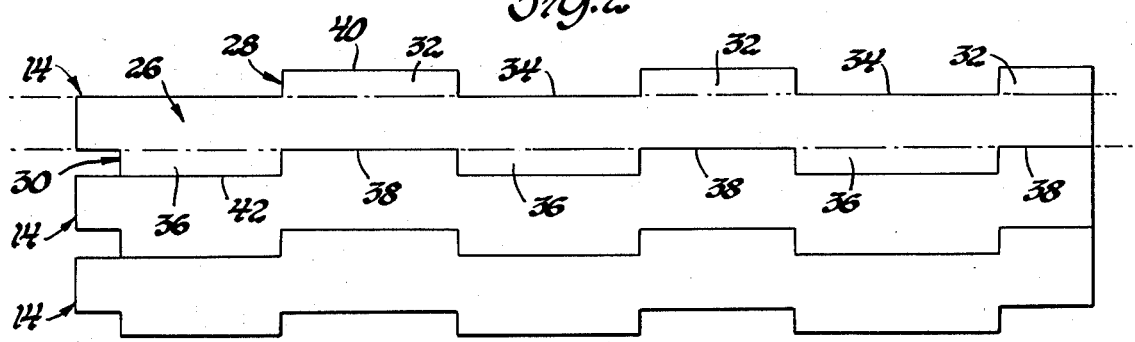
FIG. 3 illustrates a series of rim blanks as they may be stamped from a strip of metal, and particularly illustrating the nested relationship of the blanks.
Figure 4:
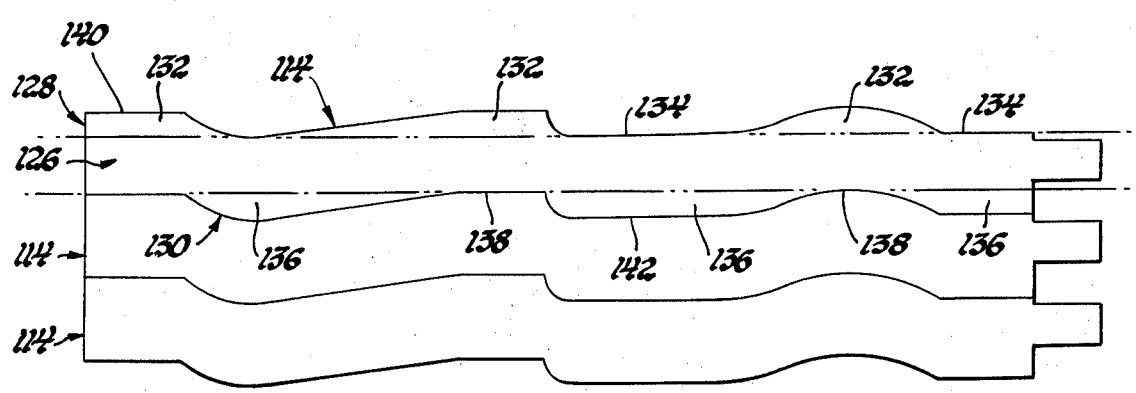
FIG. 4 is a view similar to FIG. 3 and showing a modified rim arrangement.

The rim 14 is blanked from a strip of suitable material such as steel and then formed arcuately. As shown in FIGS. 3 and 4, the rim blanks extend transversely of the strip from which they are blanked. Each rim blank has a center section 26 extending the length of the rim. The center section is the portion of the rim which is secured to the web 12 after the rim is curved to shape. Each rim has a pair of transversely spaced side sections 28 and 30 integrally formed with the center section 26. In the modification of FIGS. 1–3, side section 28 is formed as alternately spaced projections 32 and recesses 34. Side section 30 is formed with alternately spaced projections 36 and recesses 38. The outer edges 40 and 42 of the side sections defining the projections and recesses are illustrated in the modification of FIGS. 1–3 as being generally rectangular in their definition of the projections and recesses.

In the modification of FIG. 4, the edges 140 and 142 of support plates 114 are shaped so that the side sections 128 and 130 have curvilinear projections 132 and 136 and recesses 134 and 138. These projections and recesses are spaced laterally from center section 126.

As particularly shown in FIGS. 3 and 4, each projection 32, 132, is transversely spaced from a similarly shaped recess 38, 138, and each projection 36, 136 is likewise transversely spaced from a similarly shaped recess 34, 134. By using this arrangement, the amount of material required for each rim is reduced by the area of each recess which is covered by lining 16. This material reduction can amount to approximately 25 percent of the total material required for each rim. By manufacturing the rim blanks in a nested fashion, there is a minimal amount of material loss. Due to the complementary shape of each side section, the transverse width of each rim at any point along its length is substantially the same. For example, at any particular point the width of the center section and a projection 36 is substantially the same as the width of a projection 32 and center section 26, the recesses 34 and 38 extending to the edge of a portion of the rim defining the center section. The same is true of the modification shown in FIG. 4.

The lining 16 has portions 44 supported by the outer surface 24 of the rim, and the lining inner surface portions 46 overlying the recesses 34, 134 and 38, 138 are unsupported. It has been found that lining materials are able to be utilized in this manner throughout the useful life of the lining without adverse effects.

What is claimed is:

1. A brake shoe comprising a brake lining support plate having a length greater than its width, a center section extending throughout the length thereof, and side sections extending laterally from either side of said center section, said side sections having edges defining with respect to said center section laterally extending recesses and projections along the length of said support plate with each recess on one side of said center section being laterally aligned and complementary with a corresponding projection on the other side of said center section so that the width of said support plate at each point along the length thereof including said center and side sections is substantially constant, the projections on both sides of said center section defining a side-to-side projected width greater than the substantially constant width of said support plate; and a brake friction lining secured to said support plate and having a width substantially equal to said plate projected width, the center section of said support plate and the projections on both sides of said center section providing surface contact support for those portions of said brake friction lining which are adjacent thereto while other portions of said brake friction lining which are adjacent to said recesses on both sides of said center section remain without surface contact support throughout the useful life of said brake friction lining.

2. A brake shoe having a lining material support plate formed from flat stock and defined in part by spaced parallel edges on either side of a center line, said edges being formed with recesses and projections with the recesses of each edge positioned laterally opposite similarly shaped projections of each other edge so that the width between said edges is substantially constant but laterally displaced relative to said center line in accordance with the locations of said recesses and projections, and brake lining material secured to one surface of said plate and covering a plurality of said projections and recesses on each side of said center line so that said brake lining material is supported for brake actuation by said plate with the brake lining material portions covering said recesses having no surface engaging support by said plate.

3. A brake shoe mounting support plate formed from flat stock and having opposed ends, opposed sides, and opposed face surfaces, one of said face surfaces being adapted to have brake friction material secured thereto;

said opposed sides having laterally defined recesses and projections alternately spaced along the lengths thereof and adapted to be in nesting relation with the sides of other similarly constructed shoe rims, the width of said face surfaces between said opposed sides being substantially constant.

* * * * *